US010652198B1

(12) United States Patent
Morrison et al.

(10) Patent No.: US 10,652,198 B1
(45) Date of Patent: May 12, 2020

(54) THIRD PARTY-INITIATED SOCIAL MEDIA POSTING

(71) Applicant: Phanto, LLC, Scottsdale, AZ (US)

(72) Inventors: Daniel Morrison, Scottsdale, AZ (US); Charles Godewyn, Phoenix, AZ (US); David Holland, Phoenix, AZ (US)

(73) Assignee: Phanto, LLC, Scottsdale, AZ (US)

( * ) Notice: Subject to any disclaimer, the term of this patent is extended or adjusted under 35 U.S.C. 154(b) by 0 days.

(21) Appl. No.: 16/595,446

(22) Filed: Oct. 7, 2019

Related U.S. Application Data

(60) Provisional application No. 62/887,271, filed on Aug. 15, 2019, provisional application No. 62/874,510, filed on Jul. 16, 2019.

(51) Int. Cl.
 *G06F 15/16* (2006.01)
 *H04L 12/58* (2006.01)

(52) U.S. Cl.
 CPC ............ *H04L 51/32* (2013.01); *H04L 51/046* (2013.01); *H04L 51/12* (2013.01)

(58) Field of Classification Search
 CPC ....... H04L 51/32; H04L 51/12; H04L 51/046; H04L 29/06; H04L 29/08072; H04L 29/06027; H04L 12/581; H04L 29/06034; H04L 12/1822; H04L 12/585; H04L 12/58; H04L 12/5855; G06Q 10/10; G06Q 10/107
 USPC ................................................. 709/204–206
 See application file for complete search history.

(56) References Cited

U.S. PATENT DOCUMENTS

| | | | | |
|---|---|---|---|---|
| 2010/0145762 | A1* | 6/2010 | Coladonato | G06Q 30/02 705/14.4 |
| 2012/0201418 | A1* | 8/2012 | Bellwood | G06F 21/10 382/103 |
| 2012/0260353 | A1* | 10/2012 | Raley | G06F 21/10 726/29 |
| 2013/0312077 | A1* | 11/2013 | Basson | G06F 21/31 726/9 |
| 2014/0082067 | A1* | 3/2014 | Byers | G06Q 30/0601 709/204 |
| 2015/0193889 | A1* | 7/2015 | Garg | G06Q 50/01 705/14.49 |
| 2015/0227579 | A1* | 8/2015 | Cantarero | G06F 16/313 707/708 |
| 2015/0381371 | A1* | 12/2015 | Liu | G04F 10/00 382/190 |

(Continued)

*Primary Examiner* — Abdullahi E Salad
(74) *Attorney, Agent, or Firm* — Brad Bertogolio; Intelink Law Group PC

(57) ABSTRACT

Systems and methods for posting content via a network-connected communication system. A requestor may direct a content post request to a target poster. The target poster receives a notification of the content post request and is prompted to respond with a qualifying post. Constraints for a qualifying post may include, amongst other things, a predetermined time period during which the post must be submitted, preclusion of other system or application functions until submission of a qualifying post, inclusion of a photo captured by a camera integrated into the target poster's computing device, and capturing of such a photo at a geographic location proximate where the target poster received the notification. The qualifying post may be published back to the requestor and optionally other users.

13 Claims, 14 Drawing Sheets

(56) References Cited

U.S. PATENT DOCUMENTS

| | | | |
|---|---|---|---|
| 2016/0125451 A1* | 5/2016 | Garg | G06Q 30/0243 |
| | | | 705/14.42 |
| 2016/0164846 A1* | 6/2016 | Casler | H04W 12/08 |
| | | | 726/4 |
| 2018/0006992 A1* | 1/2018 | Siswadi | H04L 51/32 |
| 2018/0192087 A1* | 7/2018 | Dudko | H04N 5/262 |
| 2018/0246983 A1* | 8/2018 | Rathod | H04L 63/102 |

* cited by examiner

US 10,652,198 B1

THIRD PARTY-INITIATED SOCIAL MEDIA POSTING

TECHNICAL FIELD

Embodiments of the present disclosure relate in general to content posts on social media and other electronic communication services, and in particular to computer-implemented systems and methods to interactively share image-based content.

BACKGROUND

In recent years, social media services and other online communication services have become increasingly important avenues for human expression and communication. For many individuals, online platforms have become a primary method by which they communicate. Such services include, without limitation, Facebook®, YouTube®, Instagram®, Snapchat®, WhatsApp®, Twitter®, Telegram®, Discord®, and online forums and chatrooms.

Sharing personal moments with friends, family, and the public through electronic means, in various formats including image, video and text, has brought people closer together by providing a glimpse into the life experiences of one another. This value is increased proportionately as individual posts are shared to more than just one friend at a time. When sharing such personal moments, users tend to edit them, both consciously and subconsciously, to try to make those moments look good. One of the most powerful ways users edit shared moments is through self-selection of which of their moments to share. For example, individuals tend to capture and/or share moments they think would be interesting to others, or that make their lives look interesting, such as vacation moments, special events, or moments they are doing something noteworthy or in which they think they look good or interesting.

More recently, as the world of simplified photo filters exploded that make us and our photos look better or more interesting than real life, combined with mass sharing and the seeking of likes and other feedback from followers, personal posts became synonymous with highlights and increasingly, with inauthenticity. In extreme but all too common situations, users engage in a race to see whose lives look better. This pervasive inauthenticity has started a counter trend to post content of a more authentic nature, particularly among digital natives whose digital and real lives are intertwined.

To some, this trend might be thought of as a way to cleanse one's psyche by showing a real side of one's life, or as a way to reinforce the idea that friends like us for who we truly are in our unfiltered, non-edited moments, in direct contrast to what we might share on common social platforms in the race for social validation. One example of this counter trend toward authenticity was the emergence of ephemeral photos and videos such as those made popular by Snapchat and later incorporated by Instagram, Facebook, and others, which tend to foster more authentic, less edited posts. Another trend was the emergence of fake accounts on Instagram (often referred to as Finsta accounts), considered far more private than traditional accounts and therefore safer for posting your real, unedited and often unflattering but still personally meaningful moments.

But while these ephemeral and more private methods of sharing foster greater authenticity than their early social media predecessors, they still maintain perhaps the most powerful editorial filter of all, the user's ability to fully control which of their personal moments to share. We start doing this simply by choosing which moments to take out our devices and capture, and if we don't share these instantly, we subsequently do this again by choosing which of our previously captured moments (e.g. from our camera roll) to post on social media (whether one-to-many or one-to-one posts). Without consciously recognizing it, this means many more authentic, less planned moments of our lives go uncaptured and unshared. The candid, non-posed, unplanned moments that would often serve as the most accurate reflection and reminder of what our lives were really like slip by undocumented. All the while, sharing the more authentic moments from our lives would allow us to grow even closer with our true friends by knowing what one another are really experiencing, and reflecting on our own authentic moments later in life would provide a richer, more meaningful memory of our actual journey.

SUMMARY

One approach to sharing content of greater authenticity is via methods and systems that shift key decision-making concerning selection of which moments to capture and share, by delegating those decisions to someone or something other than the primary post author. In some embodiments, decisions concerning timing of when an image or video will be captured for sharing may be made by one or more individuals not even physically present with the post author or the capturing device at the time of capture. A requestor may initiate a post request to a target poster's device, and the target poster may be provided with a limited period of time in which to capture and share such a post using the receiving device (e.g. smartphone). Additionally or alternatively, a target poster may be precluded from accessing certain system or application functionality until a qualified content posting is submitted (or such functionality is restored after a predetermined period of time).

In some embodiments, the timing of when an image or video will be captured may be controlled by the system itself rather than another user (e.g. by implementing an automated random request-for-post generator that sends users requests at a random times, or through another system incorporating artificial intelligence or other logic to optimize ideal times to request posts).

The externally i.e. third party-triggered, qualified post may then be published via one or more social networking platforms for viewing by others, in either a one-to-many or one-to-one sharing format. In some embodiments, the externally triggered post may be transmitted back to the requestor via a direct messaging operation. In some embodiments, a requestor may incur a fee for submitting a content post request.

To ensure users remain motivated to send and receive such posts, certain system constraints may be imposed such as how often a user may receive such requests, and response statistics may be published for the author and/or their friends showing how often they respond to such posts or how long their unbroken streak of responses has gone on. When such a system is successfully implemented, it may operate as if one individual is able to see what is on a remote friend's camera device at any moment simply by tapping a button to initiate a viewing request.

Various other objects, features, aspects, and advantages of the present invention and embodiments will become more apparent from the following detailed description of preferred embodiments, along with the accompanying drawings in which like numerals represent like components.

DETAILED DESCRIPTION OF THE DRAWINGS

Figure 1:
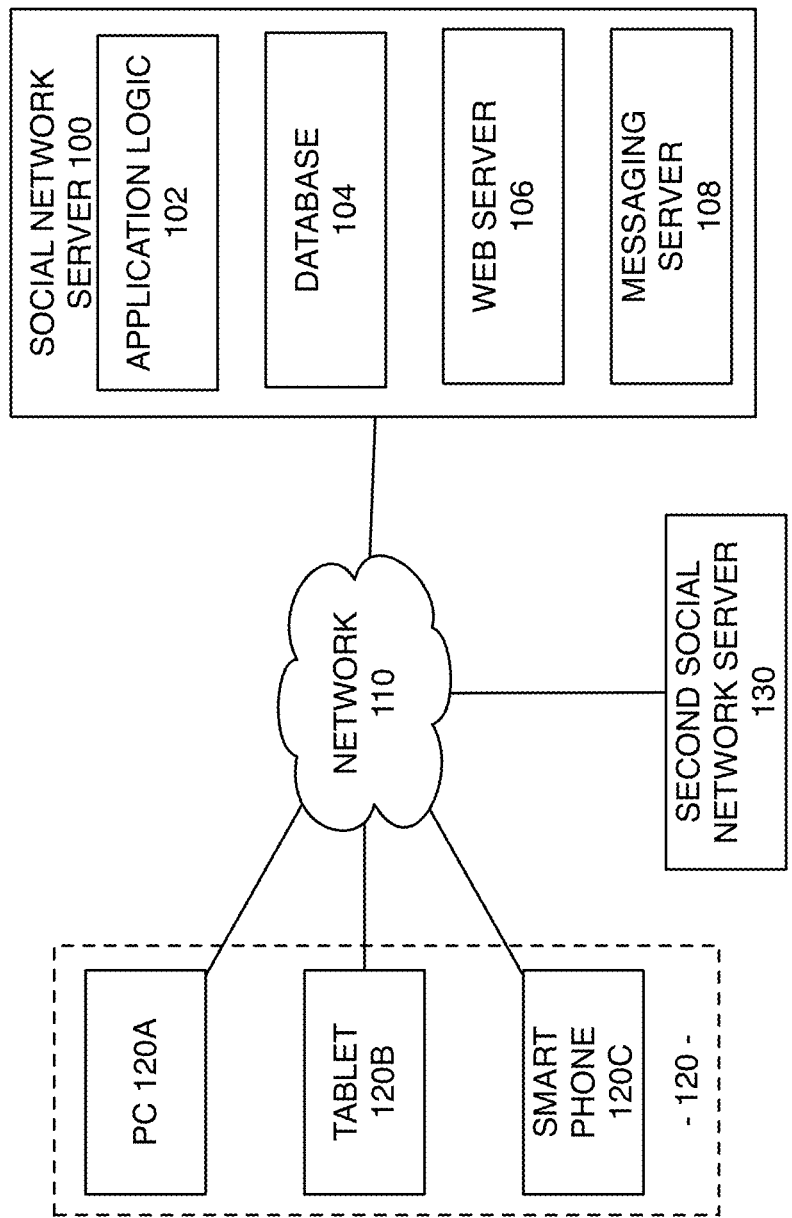
FIG. 1 is a schematic block diagram of a computing environment.

While this invention is susceptible to embodiment in many different forms, there are shown in the drawings and will be described in detail herein several specific embodiments, with the understanding that the present disclosure is to be considered as an exemplification of the principles of the invention to enable any person skilled in the art to make and use the invention, and is not intended to limit the invention to the embodiments illustrated.

FIG. 1 is schematic block diagram of an embodiment of an online communication platform, such as a social media service. Server 100 communicates, inter alia, via computer network 110, which may include the Internet, with user devices 120 such as personal computer 120A, tablet computer 120B and smart phone 120C. While certain illustrated embodiments are implemented using smartphones, tablets or other mobile devices as user devices, it is contemplated and understood that embodiments may also be used with personal computers and any other device that a user may use to capture images or videos, or to access or post to social media or other digital communication services.

Server 100 implements application logic 102, and operates to store information within, and retrieve information from, database 104. The term "database" is used herein broadly to refer to an indexed store of data, whether structured or not, including without limitation relational databases and document databases. Web server 106 hosts one or more Internet web sites and/or Application Programming Interfaces (APIs) enabling outside user interaction with, amongst other things, application logic 102 and database 104. Messaging server 108 enables messaging, such as mobile network messaging service (e.g. SMS or MMS), email, or application notifications, between server 100 and user devices 120.

Second social network server 130 is a network-connected communication platform operating independently from social network server 100. In some circumstances, users may communicate using either or both of social network server 100 and second social network server 130.

While depicted in the schematic block diagram of FIG. 1 as block elements with limited sub elements, as known in the art of modern web applications and network services, servers 100 and 130 may be implemented in a variety of ways, including in a distributed computing environment where tasks are performed by remote processing devices that are linked through a communications network. In a distributed computing environment, program modules may be located in either or both local and remote computer storage media including memory storage devices. That said, the implementation of servers 100 and 130 will typically include, at some level, one or more physical servers, at least one of the physical servers having one or more microprocessors and digital memory for, inter alia, storing instructions which, when executed by the processor, cause the server to perform methods and operations described herein.

Typically, server 100 interacts with user devices 120 to render a user interface, enabling communication of information to users of devices 120 and interaction between user devices 120 and server 100. Examples of user interfaces may include, inter alia, a mobile app graphical user interface rendered on a touch-sensitive display screen of a smartphone; or a web application rendered on web browser software running on a personal computer equipped with a keyboard and mouse. These and other embodiments facilitate implementation of methods and systems described herein.

Figure 2:
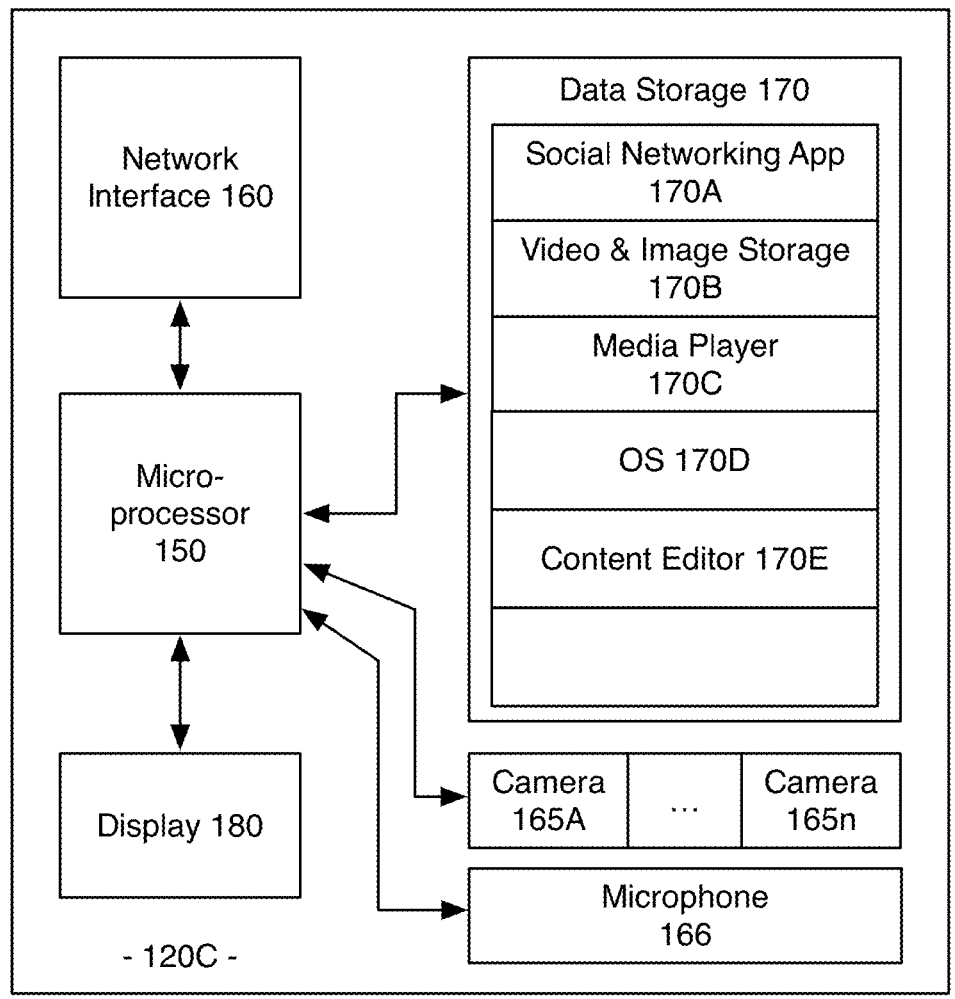
FIG. 2 is a schematic block diagram of a user computing device.

FIG. 2 is a schematic block diagram of an exemplary user device, smart phone 120C. Smart phone 120C includes microprocessor 150. Microprocessor 150 is configured to transfer data back and forth with data storage 170. Data storage 170 includes, inter alia, social networking application 170A, video and image storage 170B, media player 170C, operating system software 170D, and content editor 170E. Social networking application 170A enables interaction between user device 120C and a social networking service, and may be implemented via, e.g., a locally-installed application and/or a web application implemented using web browser software. Video and image storage 170B stores digital video and image content, such as user-generated photos and videos. Media player 170C contains instructions that can be executed by microprocessor 150 to render media content on display 180, such as video clips and images. Operating system software 170D contains instructions that can be executed by microprocessor 150 to implement a computing device operating system. Content editor 170E contains instructions that can be executed by microprocessor 150 to enable a user to interactively modify content including digital images and/or video stored within video and image storage 170B.

Device 120C further includes digital cameras 165A-n, capable of recording digital images and digital video content within video and image storage 170B. Network interface 160 enables data communications with external networks, and may include common communication mechanisms including a cellular modem, Bluetooth interface and/or wireless Ethernet interface. Touchscreen display 180 enables user interaction with device 120C.

It should be appreciated by those of ordinary skill in the art that FIGS. 1 and 2 depict the various computing devices and environments in a simplified manner for purposes of clarity, and practical embodiments may include additional components and suitably configured processing logic to support known or conventional operations and functionality not described in detail herein.

Figure 3:
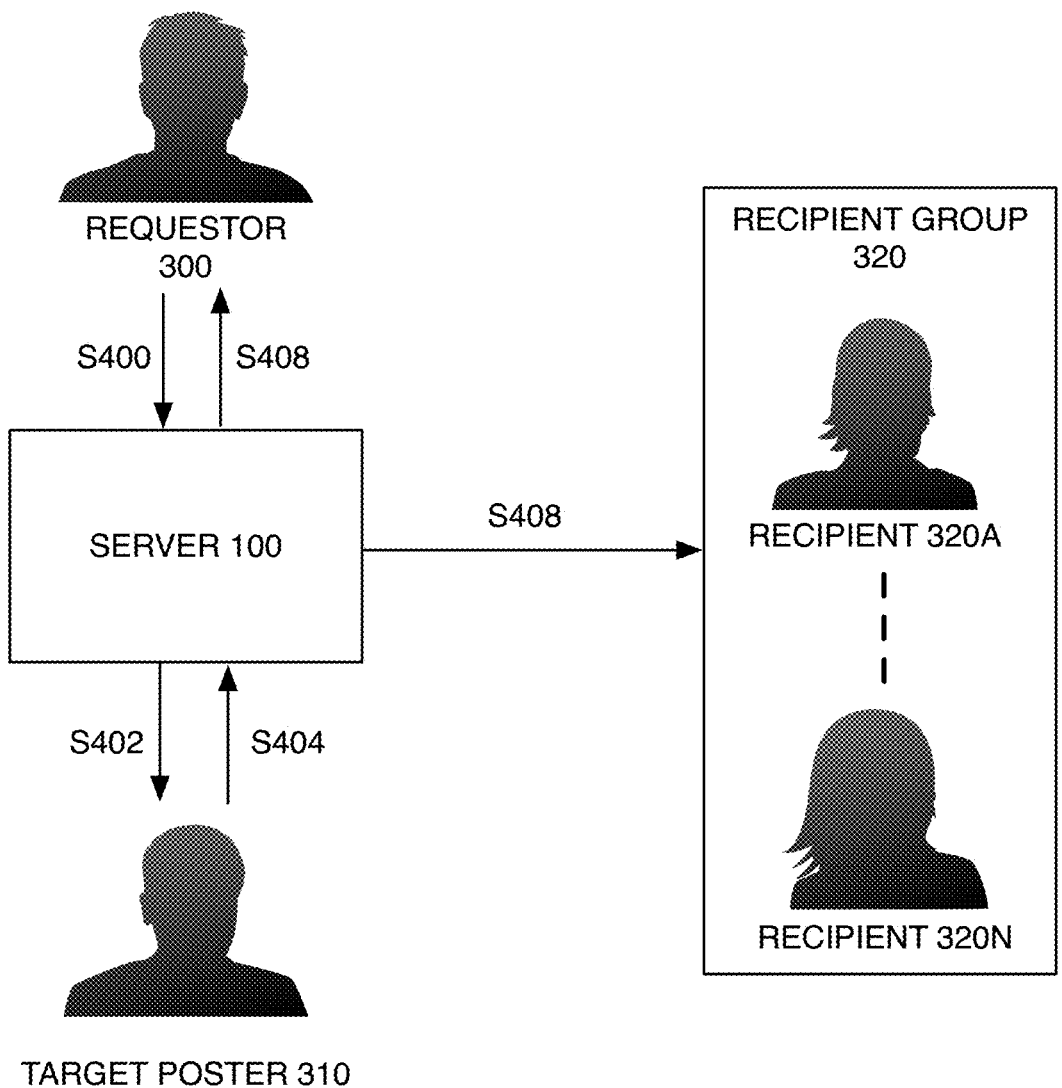
FIG. 3 is a schematic block diagram of individuals involved in requesting, creating and viewing an externally-triggered content post.
Figure 4A:
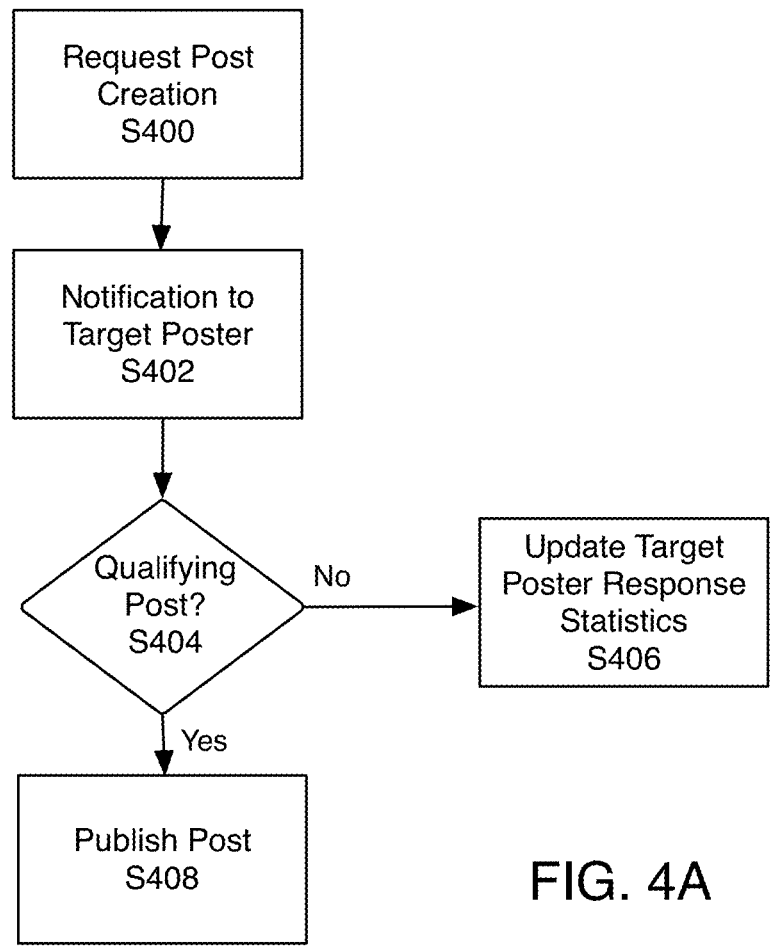
FIGS. 4A and 4B are each flow charts of processes for generating externally-triggered posts.
Figure 5:
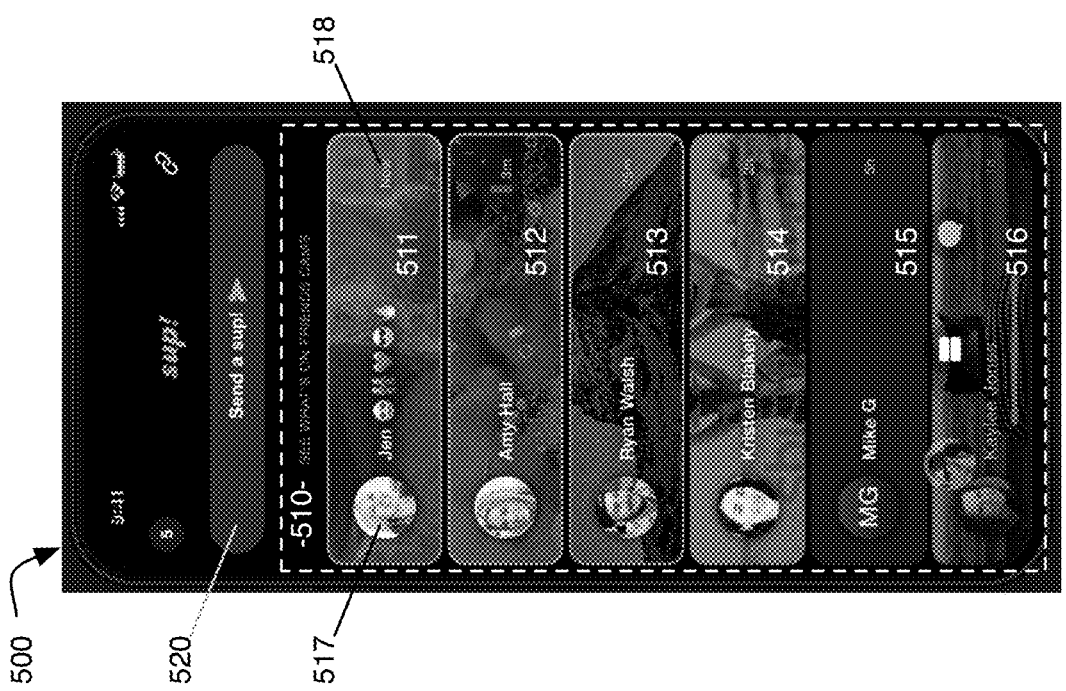

FIG. 3 is a schematic block diagram of parties involved in an exemplary content creation using an embodiment described herein. Requestor 300, target poster 310 and recipient group 320 (including multiple recipients 320A through 320n) may each be, for example, users of a social networking service implemented by server 100. FIG. 4A is a flow chart of a process for generating a third-party-initiated social media post, in the context of FIG. 3. The process of FIG. 4A can be implemented by, for example, the parties of FIG. 3, using devices such as that of FIG. 2, and in a computing environment such as that of FIG. 1. FIG. 5 et seq. illustrate application embodiments that may be rendered on a user device, such as smartphone 120C, while implementing the process of FIG. 4A.

FIG. 5 illustrates an exemplary display 500 rendered by social networking application 170A, as implemented on a smartphone 120C in coordination with social networking service 100. Display portion 510 contains a feed listing social networking connections having recently made externally-triggered content posts, in accordance with embodiments described herein. In the embodiment of FIG. 5, feed 510 is comprised of content post indicia 511-516. Each content post indicia includes an indication 517 of the post author (e.g. profile image and name), as well as content post time indicator 518 conveying how long ago the post was created. Content post indicia 511-516 are rendered in time order, with most recent posts appearing at the top. Display portion 510 preferably comprises a scrollable feed, with further content posts available further below. Content post indicia 511-516 may be tapped or selected by a user to view the associated content post. In the illustrated embodiment, content post indicia 511-516 correspond to a most recent post from an associated user. However, it is contemplated and understood that content posts generated in accordance with methods and systems described herein may alternatively or additionally be presented to users via other content display paradigms, including modes of content display known for use with other types of social media content, such as a user-specific story gallery or direct messaging posts.

Figure 6:
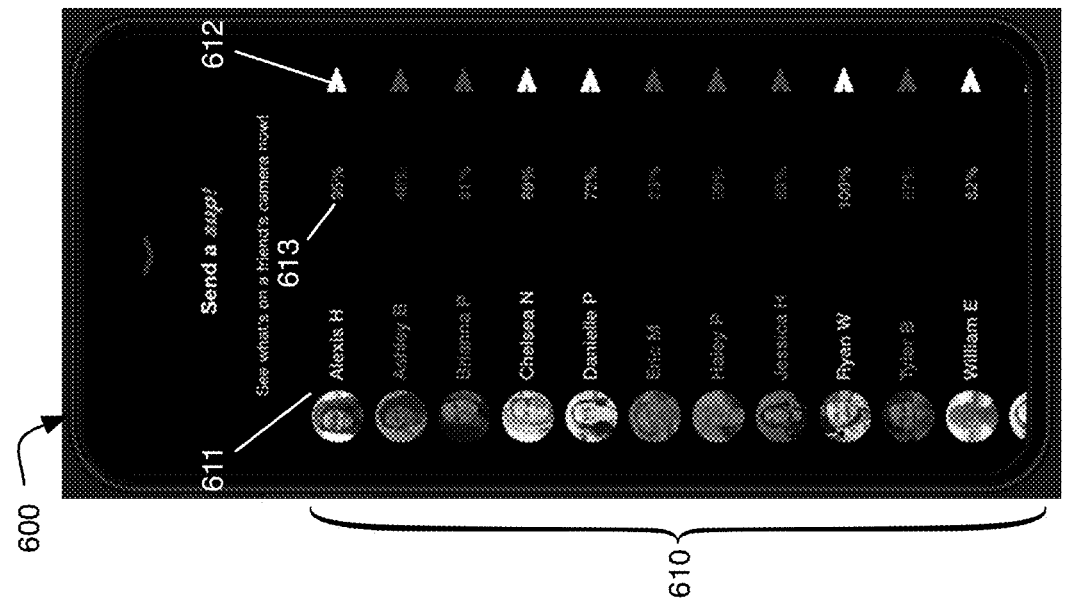
FIGS. 5, 6, 7, 8, 9 and 10 are mobile device displays of user interfaces for requesting externally-triggered posts.

Button 520 provides a mechanism for a requesting user 300 to initiate a request for a target poster 310 to create a content post (step S400). In response to selection of button 520, requesting user 300 may be queried to identify a target poster 310 to whom a content post request should be directed. Display 600 (FIG. 6) illustrates an exemplary mechanism for doing so, as implemented by social networking application 170A on smartphone 120C. Display area 610 provides a scrollable list of other users to whom an external content post request may be sent. In some embodiments, display area 610 may be populated with indicia corresponding to other users having a qualifying social network connection to the requesting user, such as a "friend" status with requestor 300 or a prior authorization to provide external content post requests. The target recipient list area 610 may include identifying information for potential target recipients (e.g. image and name listing 611), and a SEND icon 612 selectable to transmit the external content post request.

In some embodiments, additional information may be provided. For example, mechanisms may be implemented to foster regular and predictable responses from users. Such mechanisms may include, amongst other things, cues within the user interface to incentivize request recipients to respond, as well as constraints on sending of requests to prevent requests from becoming abusive or burdensome. With regard to the former, display 600 includes responsiveness indicator 613, indicating the percentage of external content post requests to which the associated user has provided a timely or qualifying response. The response rate indicia provide insight for a request sender into whether a request will be answered or wasted (especially effective as a behavior incentive if sending of requests is limited in supply) and simultaneously serves as an incentive for a request recipient to answer while minimizing how many they skip.

In order to maximize participation and curb abuse or harassment of users, or avoid undesirable user experiences, preferably, system 100 may impose various limitations on sending of post requests to target posters. Such limits may include, for example, a maximum number of requests that may be sent (or received) by a given user per day, a maximum frequency of requests that may be sent (or received) by a given user in a given time period (e.g. per hour), a minimum elapsed time between requests, a maximum number of requests from a given requesting user 300, a minimum time period that must elapse before a given sending user may send a content post request to the same recipient user, or other criteria. For example, in one exemplary embodiment, users may be permitted to transmit up to three post requests within a 60 minute window of time. Once a user has requested three content posts and less than 60 minutes has elapsed since the first such request, the user may be prevented from submitting another content post request (e.g. via disabling of, or preventing access to, user interface elements utilized for requesting content posts) until the number of post requests in the trailing 60 minute window falls below three. Such constraints may be implemented, in some embodiments, by server 100 (e.g. via operation of application logic 102); in other embodiments, such constraints may be implemented by a local application operating on a user device (e.g. via operation of social networking app 170A on user device 120C); in yet other embodiments, a combination of server-side and user device operations may be utilized.

Other types of constraints and operational rules may also be imposed in some embodiments. A cooldown period may be imposed on a user after receiving a request. For example, a system may enforce a minimum number of minutes that must elapse after a user receives a content post request, before another user may send a content post request to the same request recipient. This may be valuable in that if a user receives too many requests in a short period of time, and the recipient's personal circumstances have not substantially changed since the prior request, the user is likely to feel fatigued or overwhelmed with relatively low value requests.

In some embodiments, target recipient list 610 may be displayed in such a manner as to indicate which users are currently eligible to receive an external content request. For example, in the illustrated embodiment, text and icons associated with users eligible to receive requests are rendered in a bright color (e.g. white), while users not eligible to receive a request from a given requestor 300 are rendered by the requestor's app in a muted color (e.g. gray).

Figure 8:
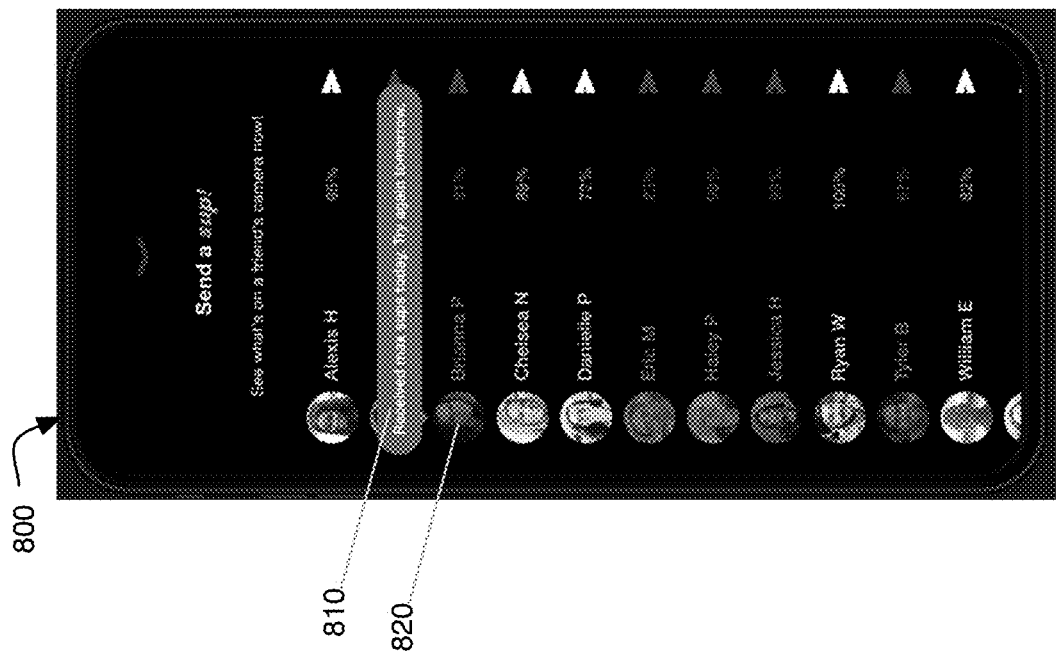
Figure 7:
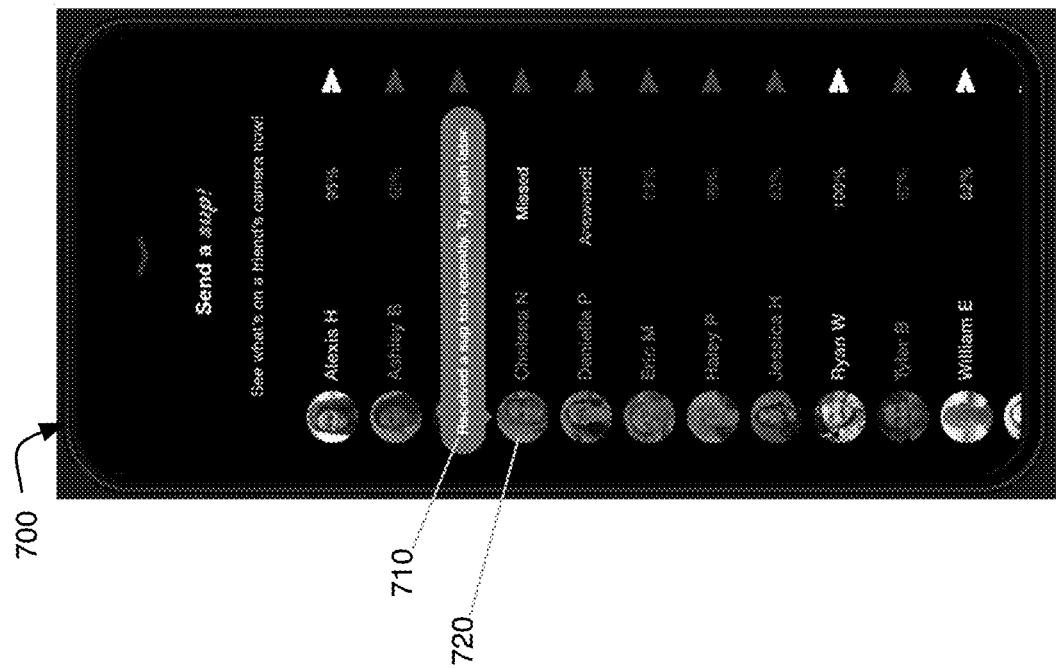
Figure 9:
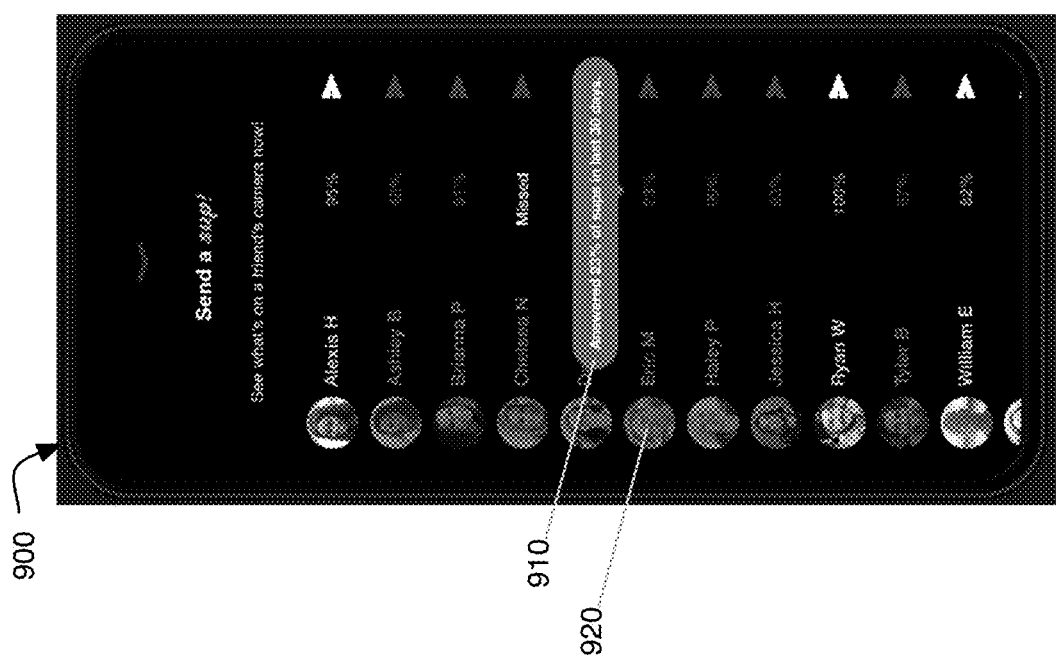

Social networking app 170A may also cause messages to be displayed providing a requestor 300 with feedback concerning options available in the app. For example, in FIG. 7, display 700 includes message 710 indicates that a prospective target poster 720 has received a content request too recently, such that a period of time (such as a predetermined period of time) must elapse before a subsequent content request may be transmitted. In FIG. 8, display 800 includes message 810 confirming that user 820 has received a number of requests exceeding a maximum daily limit. In accordance with another aspect of the display, explanatory messages may indicate the frequency with which a target poster provides qualifying responses to external content post requests. In FIG. 9, display 900 includes message 910 confirming that user 920 has answered 23% of external content post requests received by user 920 in the last 30 days.

Figure 10:
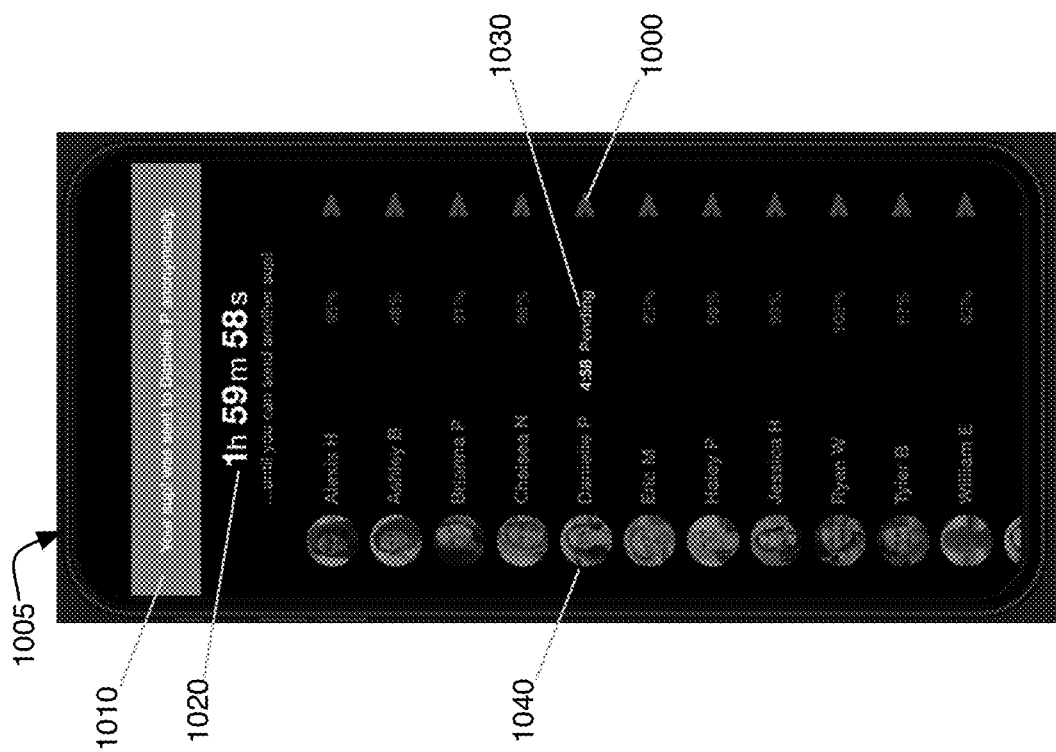

Using the display of potential recipients, a SEND icon 612 may be selected to initiate transmission of a content request from requestor 300 to target recipient 310 via social network service 100. In FIG. 10, in response to selection of SEND icon 1000, display 1005 confirms to requestor 300 that a request was successfully transmitted with message 1010. In embodiments where each requestor is limited to a minimum interval between requests (optional), message 1020 provides a countdown timer indicating the amount of time remaining to elapse between another request may be sent. Timer 1030 indicates the amount of time remaining for a target poster associated with user indicium 1040 to respond to the request. Implementing various constraints may help maintain balanced activity across time and the user base, thus avoiding burden and system failure. Without such constraints, some users may become quickly overburdened while others may be under-burdened or neglected.

While in the foregoing embodiment the content post request is originated by another user of a social network, it is contemplated and understood that in other embodiments, other third parties (i.e. individuals, systems or things not under control of the user from whom the content post is requested) may initiate a content post request from a particular recipient user. For example, in some embodiments, a content post request may be initiated as a result of automated software-controlled functionality of social network server 100. In other embodiments, content post requests may be initiated by a user of a second social network system 130. In yet other embodiments, content post requests may be initiated by bots (i.e. autonomous software agents) which may operate on a social network server such as server 100 or server 130, locally on a third-party user computing system (such as one of devices 120), or on another network-connected computing device. However, in each case, the user to whom the content post request is directed does not determine the timing of the request, thereby removing the time element of content composition from the posting user's control.

Referring back to the process of FIG. 4A, in step S402, a content post request notification is delivered to target poster 310, e.g. via mobile app notification from server 100. Target poster 310 may be presented, by a local instance of mobile application 170A, with a notification on smartphone display 180 that a content request has been made. In some embodiments, the identity of requestor 300 may be withheld from target poster 310 (i.e. the request is anonymous). This may increase response rate and serves to differentiate these requests from simple direct messaging requests with one friend asking what the other friend is doing right now. In other embodiments, target poster 310 may be notified regarding the requestor responsible for any given request. In yet other embodiments, requestor 300 may be provided with an option to notify a target recipient 310 of the requestor's identity, or to maintain the request as anonymous.

In step S404, server 100 monitors for receipt of a qualified content posting by target poster 310. To increase authenticity and reduce editorial control on the part of the post author, conditions may be placed on the timing of target poster 310's content posting to be considered a qualified response to the request of step S400. Preferably these conditions may be automatically imposed by the app interface. Preferably, conditions for a qualified response include creation of the content post in step S404 within a predetermined and narrowly limited period of time following the request of step S400 and/or the notification of step S402, and the qualified post must be generated from the device on which the notification of step S402 was received by the target poster. For example, a target poster 310 receiving a notification via smartphone 120C may be provided with a maximum of five minutes within which a content post generated on smartphone 120C will be deemed a qualified response to the request of step S400.

Optionally, other criteria may be imposed to increase authenticity in addition to, or in lieu of, time constraints, in order for a post in step S404 to be considered a qualified post in response to the request of step S400. For example, in some embodiments, qualifications may be imposed on the content of a target poster's post, such as: (i) requirement that the post contain photo and/or video content; (ii) requirement that the post contain photo and/or video content that includes the target poster (e.g. as may be determined by face recognition performed by an image recognize module, which may be implemented locally on a smartphone 120C used by target poster 310 (such as within social networking app 170A), or implemented centrally by server 100 (such as within application logic 102)); and/or (iii) that the location of target poster 310 at the time of the post in step S404 is within a predetermined radius of the location of target poster 310 at the time of request notification in step S402 (e.g. as may be determined by geolocation functionality implemented by smartphone 120C, as evaluated by social networking app 170A, thereby further ensuring that the target poster's post was made generally from the place they were located when the post was requested). Each of these qualification criterion increases the sense that a requesting user is able to see what is on a friend's device camera(s) at any time by simply initiating a request.

If a qualifying post from target poster 310 is not received in step S404, then the target poster's response statistics may be updated as maintained by server 100 (step S406), with updated statistics reflected in user app views such as indicator 613 in display 600.

Figure 11:
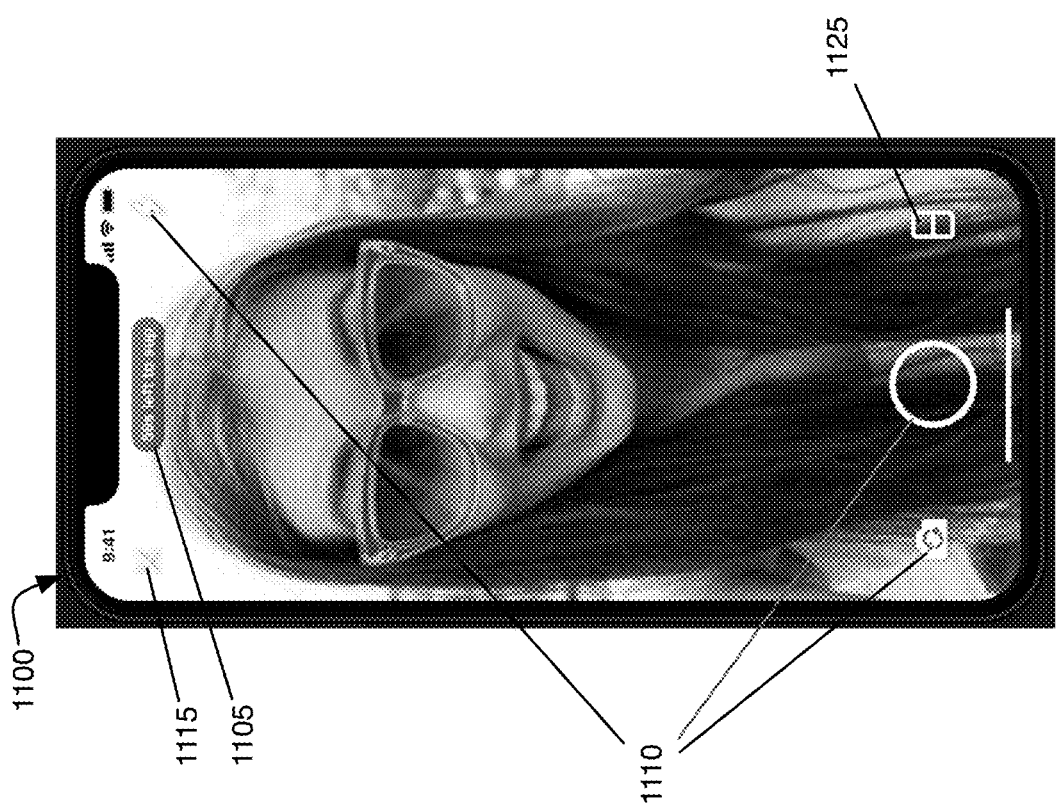

If target poster 310 responds to the notification of step S402, mobile app 170A may automatically provide a user interface specifically for generation of a content post, and such interface may impose limitations that make any such post meet any of the qualifying criteria. FIG. 11 illustrates such a display 1100. Display 1100 includes time notification 1105, communicating to target poster 310 the amount of time remaining to provide a qualified post in response to the request of step S400. Standard camera controls 1110 may be provided for post creation.

Figure 4B:
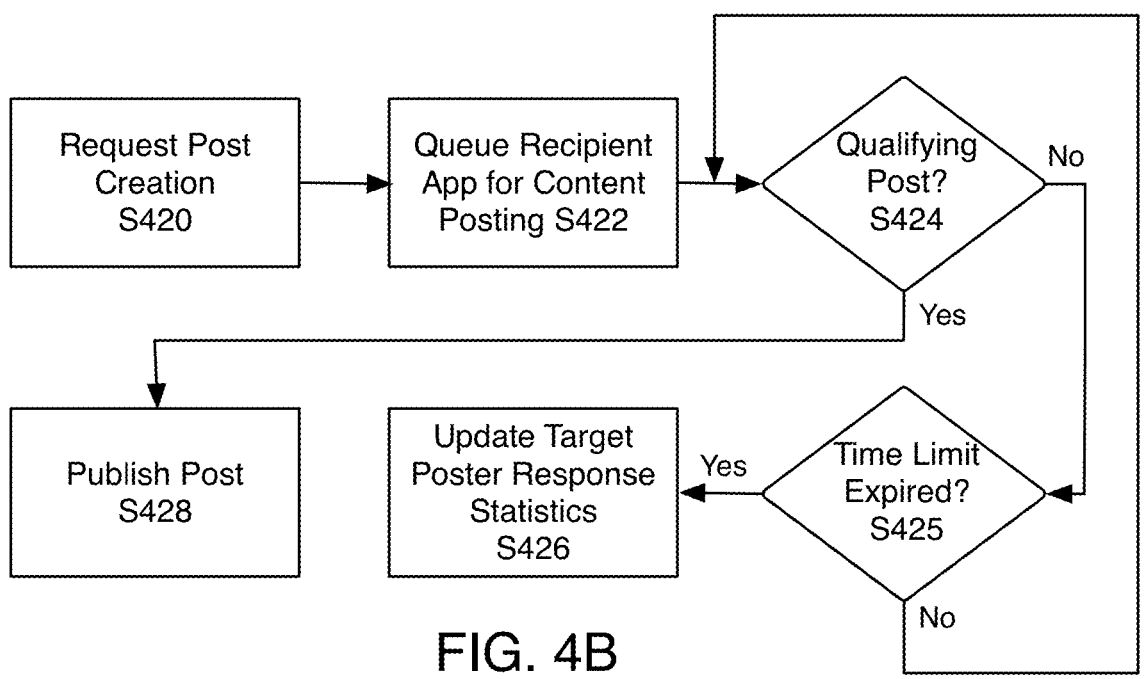

In some embodiments, a target poster may be precluded from accessing other functionality of mobile app 170A (i.e. "roadblocking" certain app functionality) until such time as a responsive content post has been created and submitted—thereby further encouraging target poster 310 to provide a timely and authentic response. Roadblocking of app functionality may be imposed in addition to, or in lieu of, a specific time limit for creating a responsive post. For example, in some embodiments, a specific time limit may be imposed, during which the user must submit a qualifying content post (e.g. newly created, containing newly-captured video or photo content). FIG. 4B illustrates a process that may be implemented by mobile app 170A operating on smartphone 120C, in accordance with such an embodiment. In step S420, a content post request is initiated by a third party, such as another user of social network server 100, a user of third-party social network server 130, or an autonomous software bot operating on a network-connected device. In step S422, the content post request is received by an application (e.g. a mobile app) implemented on a device associated with the content post recipient user (e.g. smartphone 120C). In step S424, a determination is made as to whether the recipient of the content post request has submitted a qualifying content post via social network server 100. If so, the responsive, third-party initiated content post may be published (step S428). If not, a determination may be made as to whether a time limit for submission of a qualifying content post has elapsed (step S425). Time limits may be determined by server 100, locally by a user device 120 (e.g. using social networking app 170A), or via a combination of information on and interactions between server 100 and a user device 120. If the time limit has not expired, monitoring may continue for creation and submission of a responsive content post (i.e. return to step S424). If the predetermined time limit has elapsed without a qualifying content post having been submitted, the third party-initiated content post request is deemed skipped and user response statistics may be updated accordingly (step S426).

In another embodiment, a specific time limit may not be imposed on a user to provide a responsive content post, but the user receiving a content post request may be precluded from accessing displays for viewing other users' content posts until such time as a responsive content post is provided. This type of roadblocking may not impose hard editorial control over the timing of a user's content composition, but may encourage a user to respond promptly by withholding access to app content or features.

In another exemplary embodiment, a user may not be provided with a notification of having received a content post request, but upon opening mobile app 170A after receiving a content post request, the user may be provided only with a content post authoring display (e.g. display 1100 of FIG. 11) until such time as a responsive content post is provided, precluding all use of the mobile app 170A other than content post creation upon receiving a content post request. While fixed or hard time limits may not necessarily be provided in such an embodiment, the element of surprise created by automatic initiation of a content post authoring display, coupled with roadblocking to prevent access to other functionality, may nevertheless remove editorial control over the timing of a user's content post creation, resulting in a more authentic or candid content post.

Content post authoring tools provided by mobile app 170A may be utilized to further encourage authentic and candid content posts. For example, mobile app 170A may initiate an auto-actuating camera, such that upon opening mobile app 170A after having received a content post, the user is presented with a content post creation display (e.g. display 1100) further having a countdown timer display, and upon expiration of such timer, one or more of cameras 165 are actuated to capture photo or video content for inclusion in a responsive content post (although the existence of the timer is optional and actuation may occur with no countdown at all in some embodiments; in other embodiments, the timer may be overridden with manual actuation of a camera shutter indicium). Another example of app-imposed limitations on user editorial control may be a limitation of the number of "re-takes" a user may cause for a qualifying content post responsive to a third-party content post request. For example, in some embodiments, a user may be provided with a single opportunity to capture a photo or video for a responsive content post request; in other embodiments, a user may be provided with some limited number of permissible retakes (e.g. 1 or 2 retakes).

Another mechanism for removing user editorial control over content post creation in response to a third party content post request is by requiring that a content post be authored and posted prior to closing or backgrounding mobile app 170A; thus, a user may not have a hard time limit in order to submit a qualifying content post, but the user must do so before performing any other function on the user's device. If the user closes or backgrounds mobile app 170A prior to submitting a qualifying content post (or activates some other control allowing the user to skip making a qualifying post in order to continue in the app), the content post request is deemed to be skipped and the user's participation metrics (as described elsewhere herein) may be negatively impacted. Such embodiments may be particularly effective when the user receiving a content post request is not provided with a notification outside mobile app 170A, preserving a component of surprise to the user upon opening mobile app 170A.

Figure 12:
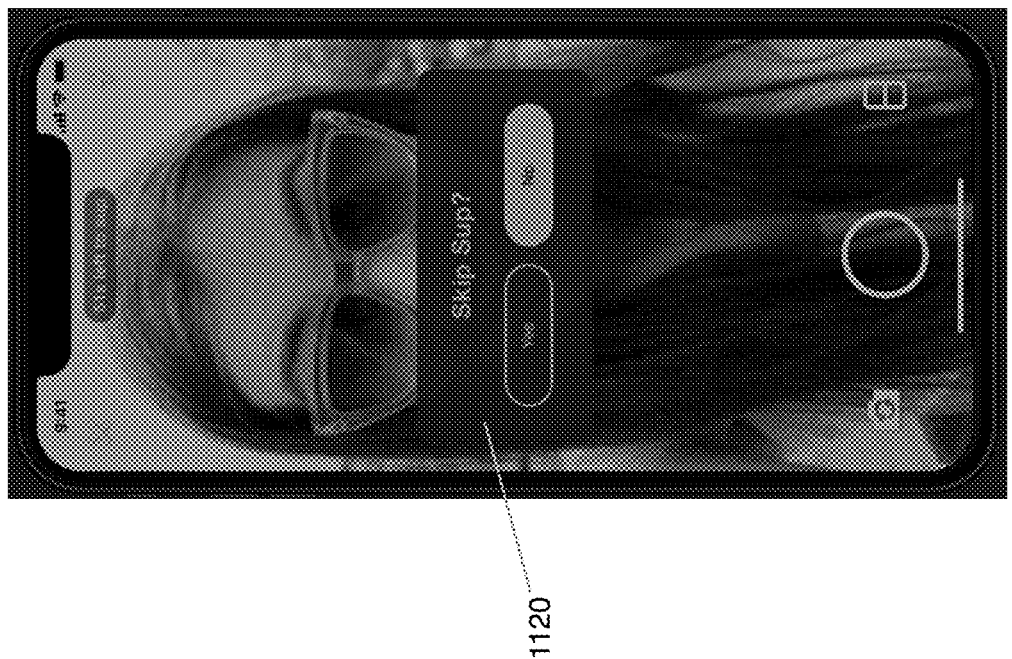
FIGS. 11, 12, 13, 14, 15A, 15B and 16 are mobile device displays of user interfaces for creating externally-triggered posts.

In other embodiments, target poster 310 may be permitted to cancel post creation, e.g. by selection of cancel icon 1115 in display 1100; a user dialog warning 1120 (FIG. 12) may be provided to confirm that the user will skip generation of a responsive content post. In yet other embodiments, the target poster may be presented with a button overlaying their current view(s) indicating they have a request waiting, which may have a timer representing the time remaining to respond. Tapping the button or taking another action in the app, such as leaving their current view, may cause the post process to begin.

Figure 14:
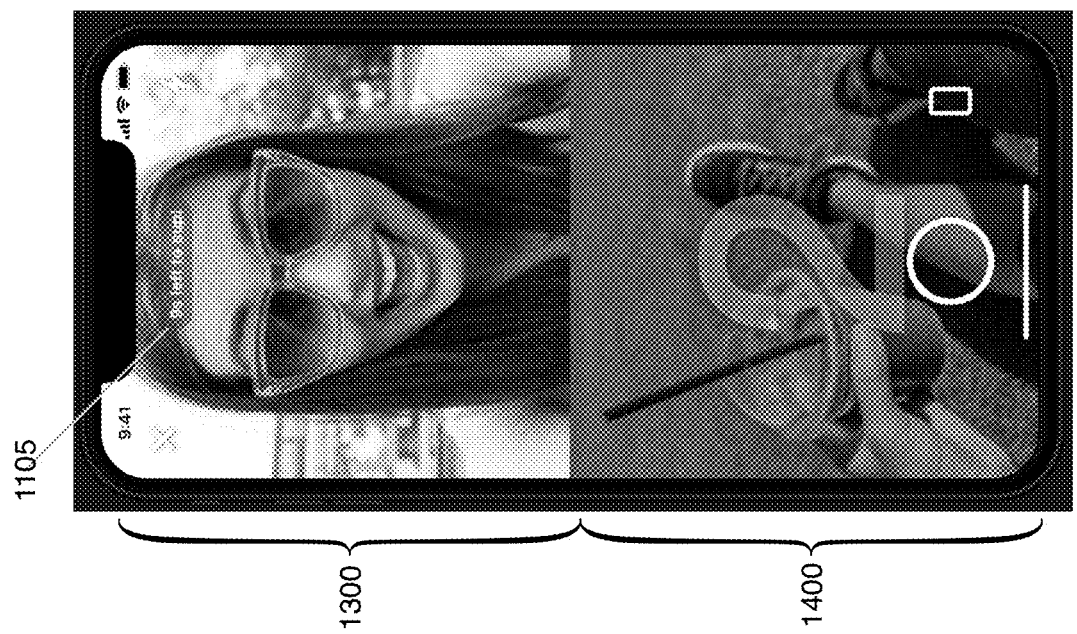
Figure 13:
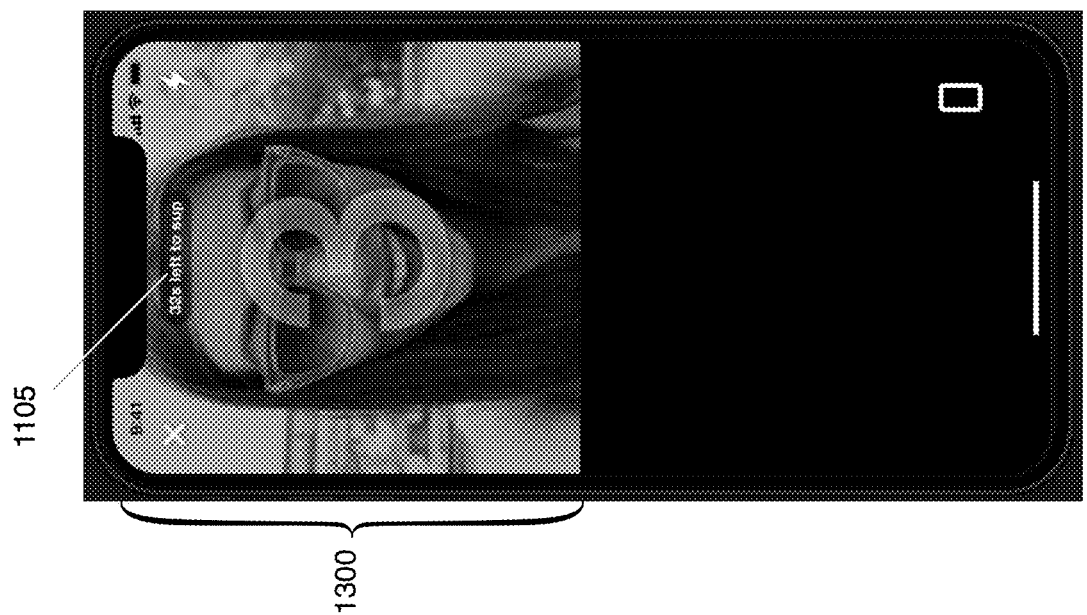
Figure 15B:
Figure 15A:
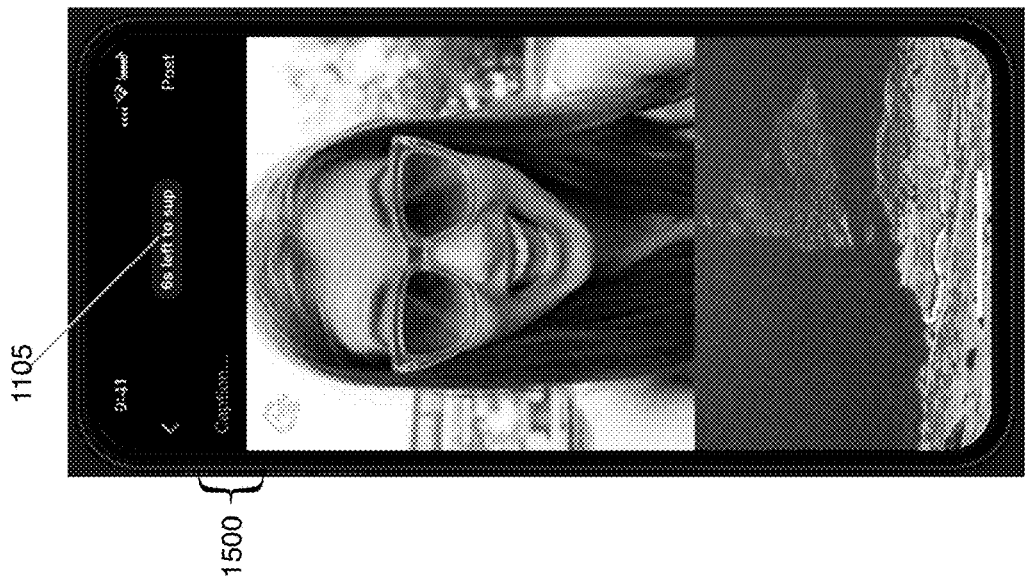

As described herein, in some embodiments, one benefit that may be provided by externally-triggered social network posts is promoting the sharing of more authentic and immersive moments. To that end, in some embodiments, it may be desirable for posts responsive to external requests to be generated using both front and rear cameras on a smartphone 120C. Such combination images may provide a viewer with insight into not just the current status of the target poster, but also the current environment in which the target poster finds himself or herself at or near the time of the request. To that end, multiple camera image capture may be initiated by a user (e.g. via selection of a dual camera capture indicium 1125), or in some embodiments, enforced by mobile app 170A by automatic operation of content post workflow. FIG. 13 illustrates an initial step in generating a front/rear camera content post, with a front camera image displayed in region 1300. FIG. 14 illustrates a subsequent step, with front camera image remaining in region 1300, and a rear camera image having been captured by smartphone 120C and inserted in region 1400. FIG. 15A illustrates a further step, whereby a user is prompted to enter a text caption in region 1500, to accompany the dual image content post. FIG. 15B illustrates yet a further or alternative step, allowing a user to add stickers, text, or other filter overlays to their post using tools 1510, to provide further expression or definition for the moment captured.

In some embodiments, to further encourage authentic, in the moment posts, a target poster's use of mobile application 170A following a notification in step S402, may initiate automatic actuation of one or more cameras within the target poster's smartphone 120C, thereby further helping ensure that the target poster shares an impromptu and authentic moment. For example, a first countdown timer may provide a user with a few seconds notice prior to actuation of a front camera, followed by a rear camera display with a second countdown timer providing the target poster with a few seconds notice before actuating the rear camera. The impromptu, automatically-taken front and rear camera images may then be combined into a qualified content posting published in step S408.

Figure 16:
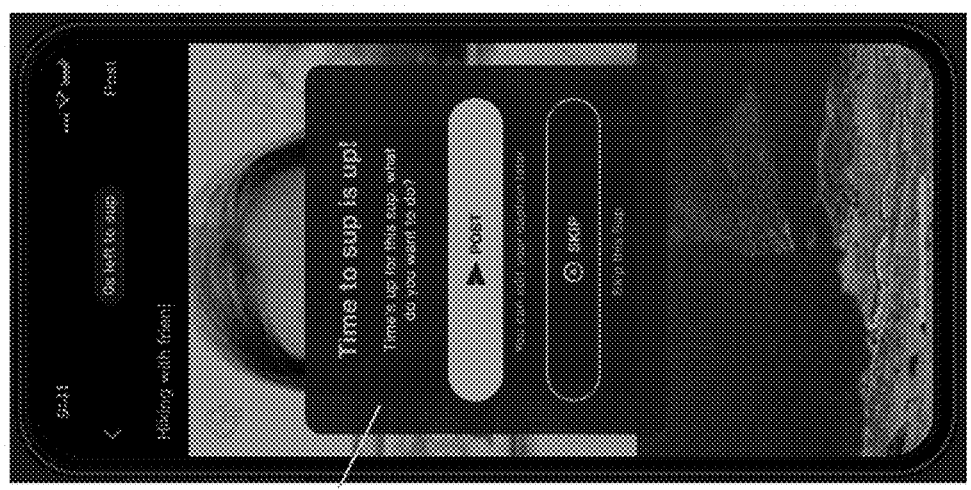

Because qualified content post generation is preferably time-dependent, even if images are not automatically taken, content post generation displays will preferably include countdown timer 1105 providing the target poster 310 with an indication of the maximum amount of time remaining for a post to be deemed a qualified response to the request of step S400. In the event that countdown timer 1105 expires in the midst of a content post creation, mobile app 170A may present target poster 310 with dialog 1600 (FIG. 16), providing an option to either publish the in-progress content post (step S408), or skip the opportunity to submit a qualified content (continuing to step S406).

While it may be desirable in some implementations for externally-triggered content posts to include photo or video content taken at the time of submission (i.e. not selected from a mobile device camera roll), in other embodiments, users may be permitted to select a previously-stored image or even post content items comprising only text. While such content items may not visually depict the target poster's current circumstances, they may still provide insight into the target poster's then-current thoughts or frame of mind.

Figure 17A:
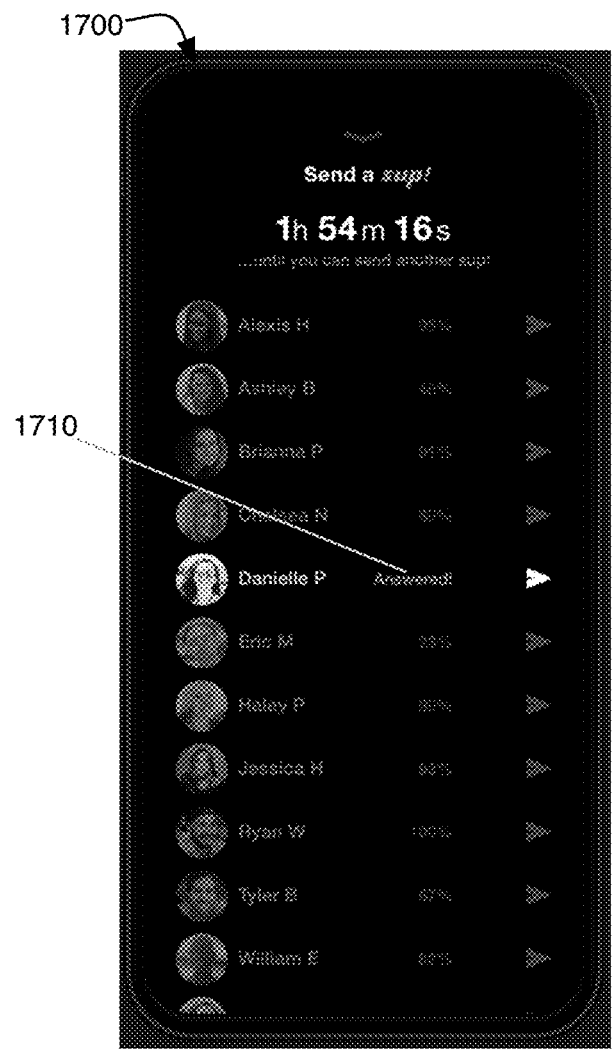
FIGS. 17A, 17B, 17C, 18A, 18B, 19, 20 and 21 are further mobile device displays of user interfaces for interactions relating to externally-triggered posts and systems implementing such posts.

In step S408, target poster 310 submits a qualifying content post to server 100, which is then published or made available via a social networking platform implemented thereon. FIG. 17A illustrates a display 1700 associated with requestor 300's instance of mobile application 170A on a smartphone 120C, comprising an update of the display of FIG. 10 in response to submission of a qualified content post by target poster 310 in step S404. Field 1030 in FIG. 10 is updated in field 1710 to notify requestor 300 that target poster 310 has provided a qualified post responsive to the request of step S400.

Qualified content items published in step S408 may be displayed to users in any of a variety of manners. In some embodiments, users within a recipient group 320 (which typically may also include requestor 300) will receive a notification that a qualified post has been submitted by a target poster 310 having a predetermined social networking connection with the recipient group member. Such notifications may come in the form of push notifications sent via the app, or by the presence of the poster's avatar or the decoration of a user's avatar, in a feed or gallery view. In other embodiments, only the requestor 300 may receive a push notification, but the qualified post may be displayed by server 100 to recipient group 320 or other users. For example, FIG. 18A illustrates display 1800, providing an exemplary feed of qualified content posts from target posters having a predetermined social networking relationship with the viewer.

Figure 17C:
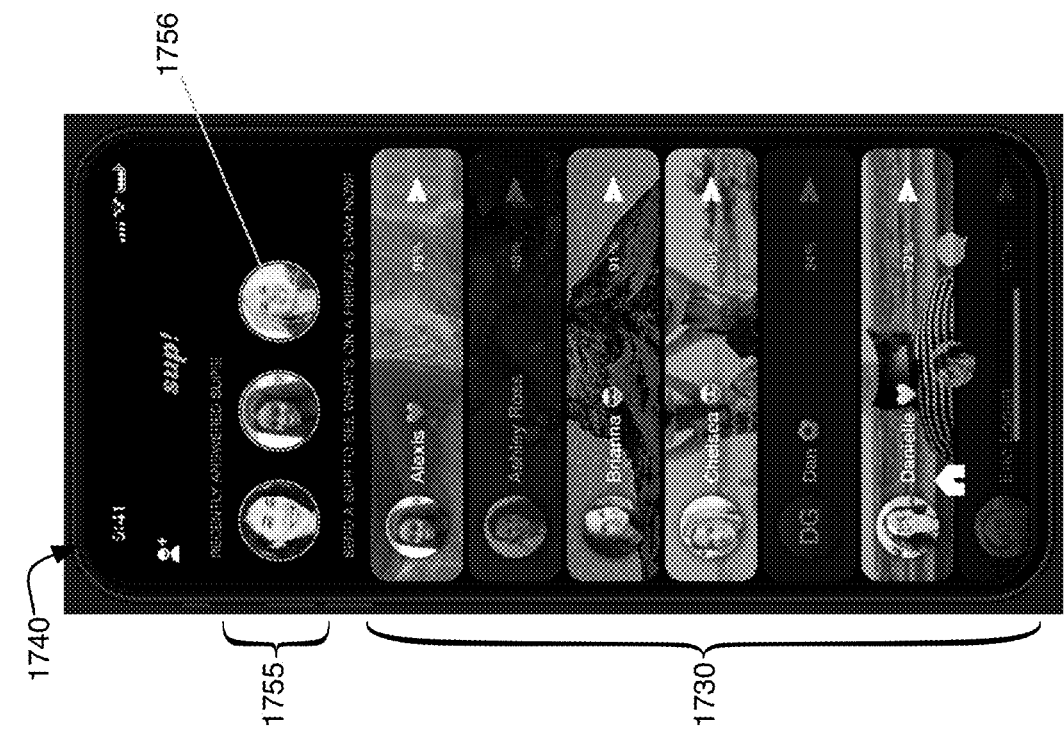
Figure 17B:
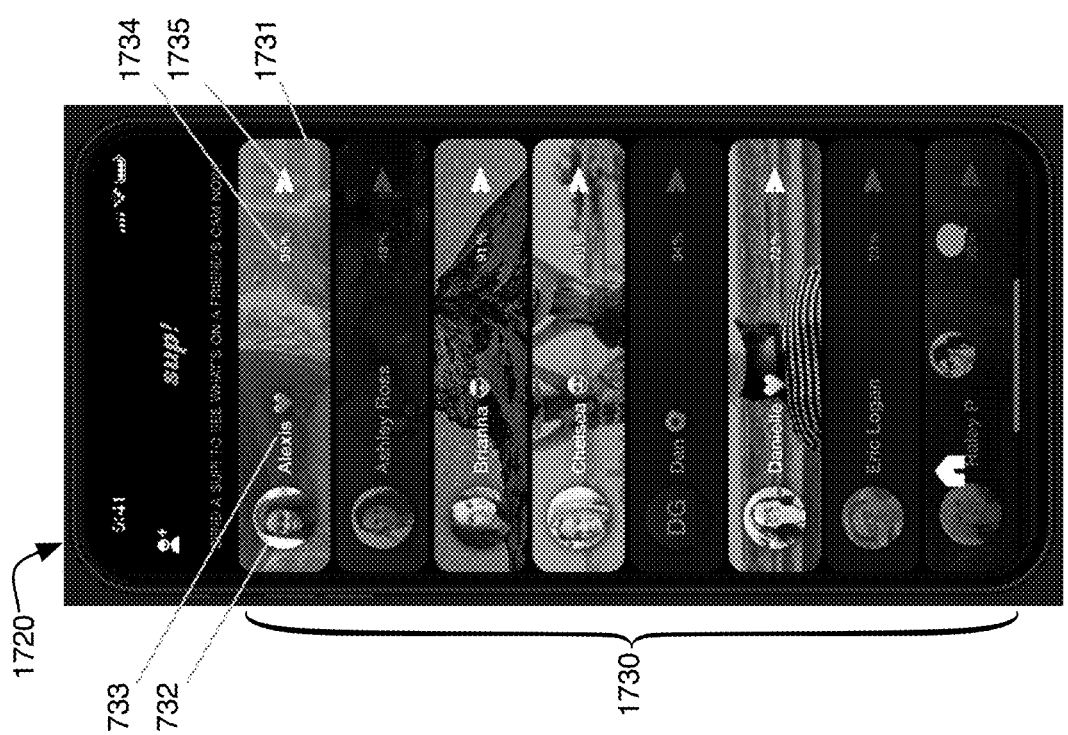
Figure 18B:
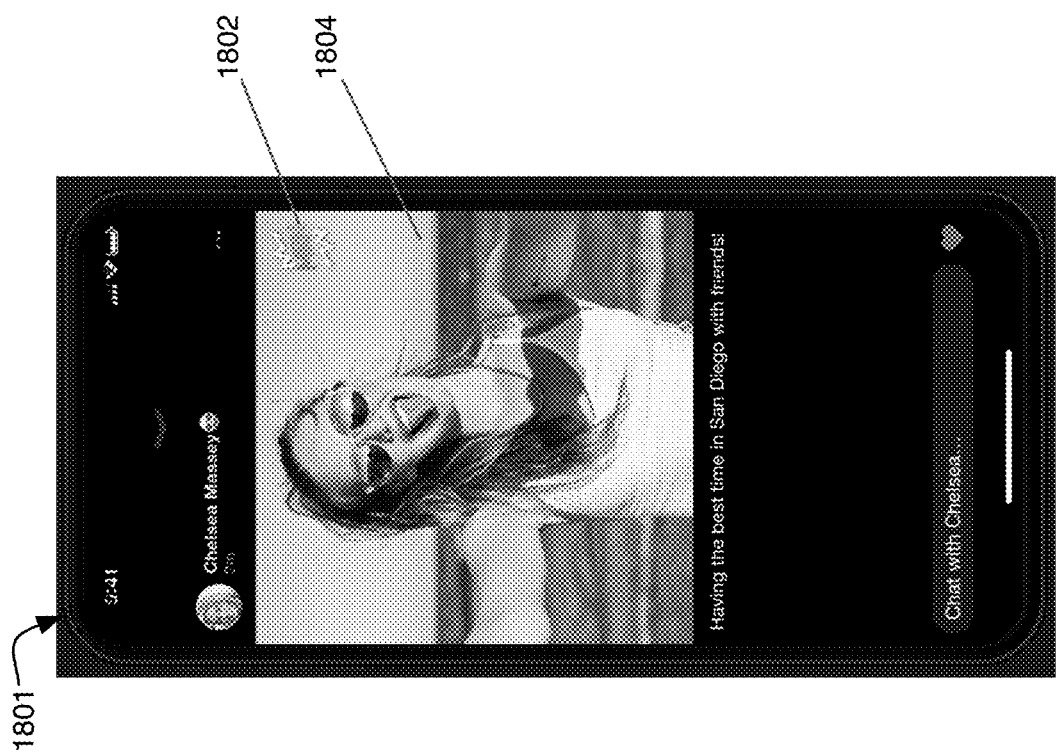
Figure 18A:
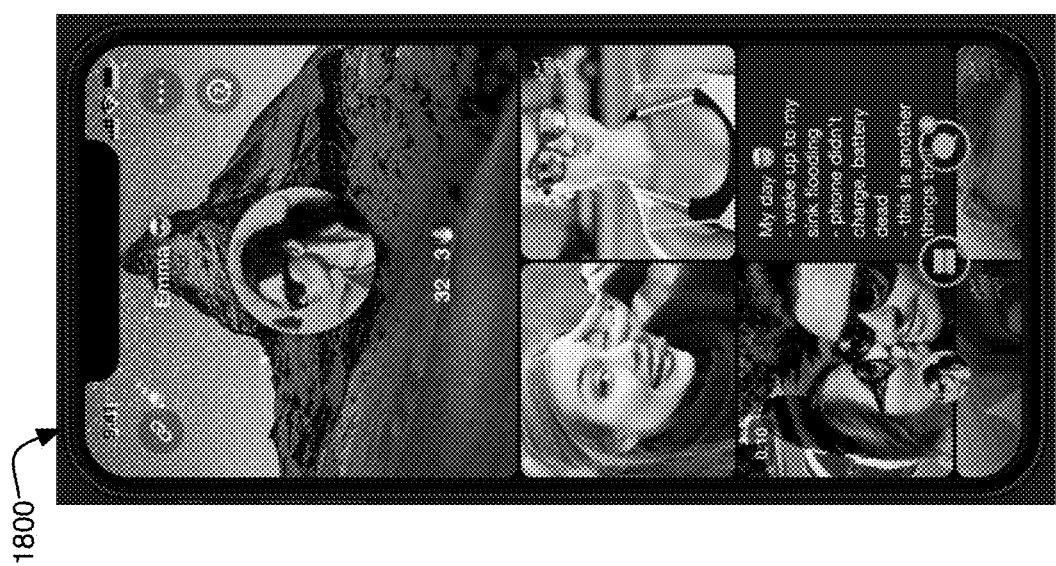

The embodiments of FIGS. 10, 17A and 18A provide separate user interface displays for sending post requests and displaying responses to post requests. However, in other embodiments, a single display may be utilized for sending externally-initiated social media posts, and notifying users of (and preferably providing quick access to) externally-initiated social media posts from others. FIGS. 17B and 17C illustrate such an embodiment. In FIG. 17B, display 1720 includes an array of user indicia 1730 (e.g. user indicium 1731), each providing a profile photo icon (e.g. profile photo 1732), user name (e.g. user name 1733), user metric (e.g. user metric 1734) and SEND button (e.g. SEND button 1735). Preferably, user indicium 1731 is filled with a user-configurable image. In some circumstances, the background image may be derived from a user's most recent or prior posting.

FIG. 17C illustrates the embodiment of FIG. 17B, further including notifications of externally-initiated postings by others. In the event that another individual, having a predetermined social networking relationship with the user viewing display 1740, submits a posting (e.g. step S408), a notification tray 1755 is rendered above array of user indicia 1730. Notification tray 1755 includes one or more posting indicia 1756, each indicative of an externally-initiated content posting. Each indicium 1756 may be selected (e.g. tapped, on a touch-sensitive display) by a user to view one or more content postings associated with the notification.

In some embodiments, content posts published in step S408 may be disseminated to user groups configured for other purposes, and/or configured via third party social networking platforms, such as publication to a Snapchat private story, publication to Instagram Close Friends, publication to all Instagram followers, or publication to all Twitter followers. Thus, some embodiments may involve integration between one platform for requesting and generating externally-triggered content posts, and third party social networking applications (such as Facebook integrated via Facebook Platform, Instagram, Snapchat integrated via Snapkit, or Twitter) on which such externally-triggered content posts may be disseminated for viewing by others.

In some embodiments, recipient group 320 may be defined generally, for all externally-triggered content posts by a target poster 310; in other circumstances, a target poster may be provided with an option to specify a recipient group 320 in connection with each externally-triggered, qualified posting.

In some embodiments, the social networking platform may be a direct messaging platform. Requests would be sent via message in the messaging platform to the target responder, either anonymously or not, and qualifying responses may also be sent as a message through the messaging system, either directly and privately to the requestor, or to a group of friends organized within the messaging system (e.g. a new or previously started group chat. In other embodiments, the response may appear to all friends of the post author via a story style post, similar to how story posts appear in Facebook Messenger, WhatsApp, or other messengers.

One exemplary application in a direct messaging platform is within network-based tools or applications used for dating, i.e. an application in which individuals may be introduced to one another and provided with tools for communicating electronically, typically in advance of in-person interactions. Such applications may include dating-specific apps (such as Tinder®) or other social media apps having direct messaging functionality that may be used for dating purposes (such as Snapchat® or Instagram®). One challenge commonly facing users of such systems is that participants may utilized old, outdated, heavily edited or carefully selected profile photos that do not accurately depict the participant's current state. Lack of candor in self-portrayal may prevent users from fairly evaluating interest and compatibility until an in-person date is arranged, with attendant monetary and time investment. In such circumstances, users may prefer to request photos spontaneously and using operational limitations described herein, in order to receive more candid and authentic insight into a matching user before investing time and money in an in-person date. In such embodiments, server 100 may be a network-connected server (or set of servers, as known in the art and understanding that server 100 as illustrated in FIG. 1 will be a simplified implementation relative to typical commercial-scale services) implementing user discovery and communication functionality common to dating apps, but further implementing externally-initiated content post requests using processes such as those of FIGS. 4A and 4B. Requestor 300 and target poster 310 may be users having been matched for communications. In order to monetize the application while also limiting usage to avoid user abuse, the Post Request step (e.g. step S400 or S420) may require payment of a fee by requestor 300.

In the context of a dating application, the intent of an externally-initiated content post may be directed more towards providing the post requestor 300 with insight into target poster 310 that is generally current (e.g. not several years old), rather than other social networking environments in which the objective may be to obtain near-real time feedback on a user's current status. Therefore, in such embodiments, time limits for response (e.g. in step S425) may be longer, such as 24 hours or 48 hours, or no particular time limit may be imposed at all (although post requestor 300 may elect to discontinue interactions with target poster 310 if target poster 310 refuses to respond with a qualifying content post). In some embodiments, regardless of whether and what time limit is imposed, target poster 310 may be precluded from further communications via server 100 with post requestor 300 unless and until a qualifying content post is submitted by target poster 310 and published back to post requestor 300. In yet other embodiments, target poster 310 may be precluded from further communications via server 100 with post requestor 300 after expiration of a period of time following the externally-initiated content post request (e.g. communications between post requestor 300 and target poster 310 may be precluded if a qualifying content post is not provided prior to expiration of time in step S425).

In some embodiments, a general purpose social networking platform, which may be implemented by server 100, may enable a variety of different types of content posts, including some posts that are qualified and generated in response to an external request (as described above), and other posts that may be traditional social network content posts that are not externally-triggered or qualified in accordance with criteria regarding generation of the post. In such environments, it may be desirable to provide content viewers with a visual indication as to which posts were externally-triggered and qualified by the rules of the system (and thereby are presumably more authentic), and which posts contain content determined by the poster without constraints. In some embodiments, a badge, icon, watermark or other indicium may be superimposed on or rendered proximate a posting in order to indicate to a viewer that the posting was externally triggered and qualified, and thus differentiating the posting for the viewer from other types of content postings (i.e. non-qualifying content posts, such that content posts that are not externally or third party-initiated, not submitted during a qualifying time period, lacking content required for qualification, not generated using a qualifying user device, or the like). For example, FIG. 18B illustrates a content posting view 1801 in which badge 1802 (comprising MRN as an abbreviation for Me Right Now) is overlaid on posting image 1804 to indicate to a viewer that image 1804 is an externally-triggered posting. In other embodiments, qualified and externally-triggered posts may be segregated within a social media application with other qualified, externally-triggered posts, such as within a specific gallery. In some embodiments, externally-triggered posts may be published in an ephemeral gallery; in others, externally-triggered posts may be published in a non-ephemeral gallery. Without such explicit designation in a social network that allows for multiple types of posts (including some that are not externally-initiated), the special authentic value of qualified posts derived from system-imposed constraints may be lost on recipients.

Figure 19:

In some embodiments, it may be desirable to provide incentive mechanisms for users to consistently respond to external post requests with qualified content postings. This may be necessary to make the system perform predictably enough for users to participate in kind with their own responsive posts. FIG. 19 illustrates such a mechanism, implemented by display 1900. Display 1900 includes a listing of other users 1902 (preferably, users having a predetermined or qualifying social network connection with the viewer to whom display 1900 is rendered). Each other user listing within listing 1902 includes a total number 1904 of qualified, externally-triggered content posts that have been submitted, and a STREAK indicium 1906 comprising the number of consecutive external post requests to which the user has provided a qualified posting in response, or the number of consecutive days a user has made at least one such qualifying post. Presenting such statistics or other reward indicia to users may inspire users desiring to present an authentic view of their lives via the social networking service to quickly and consistently respond to external post requests. In other embodiments, users may be shown a response rate for themselves and their friends, indicating what percentage of requests a user has responded to, either historically or for a recent period of time, such as the last 30 days. Such response statistics may further incentivize users to respond to requests, and in cases where users may be limited to the number of requests they can send, encourage users to choose target recipients who are more likely to answer their requests.

Figure 20:
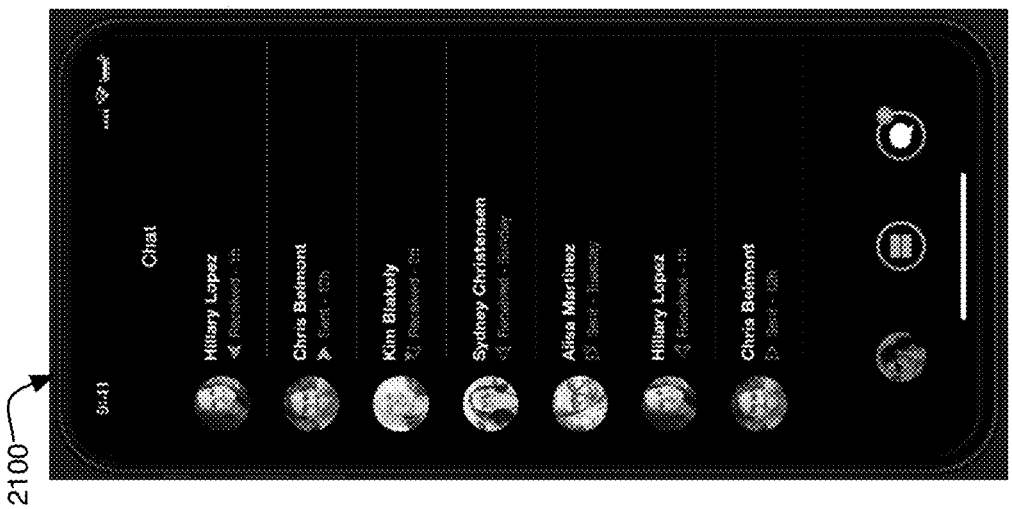
Figure 21:
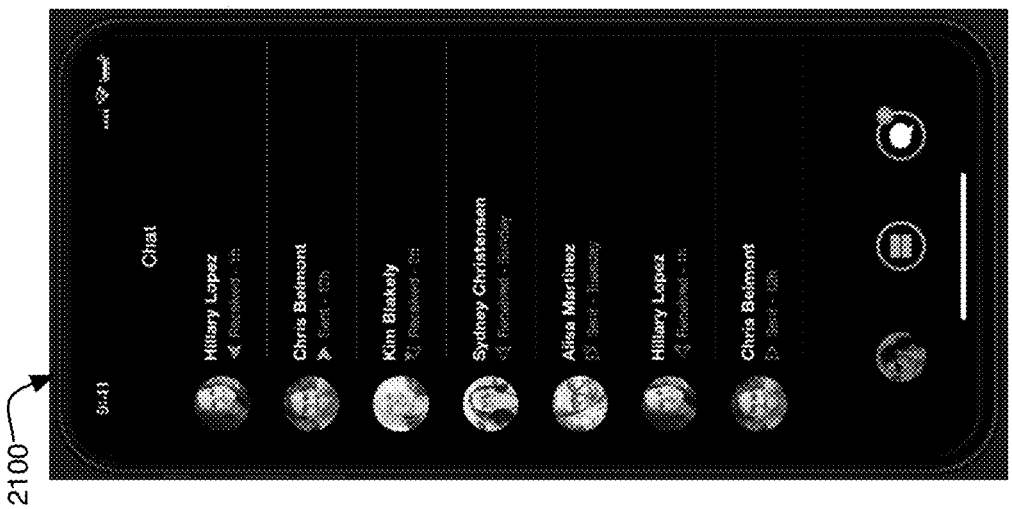

In some embodiments, other social network content and features may also be implemented in systems providing for externally-triggered posts. For example, FIG. 20 illustrates an activity feed display 2000, providing a viewer with a summary of information related to external content requests. FIG. 21 illustrates implementation of a chat mechanism, whereby users may interact with displays such as display 2100 to exchange one-to-one or group messaging within the platform in response to qualifying posts they or friends have made, or independent of such posts.

While certain embodiments of the invention have been described herein in detail for purposes of clarity and understanding, the foregoing description and Figures merely explain and illustrate the present invention and the present invention is not limited thereto. It will be appreciated that those skilled in the art, having the present disclosure before them, will be able to make modifications and variations to that disclosed herein without departing from the scope of the invention or appended claims.

The invention claimed is:

1. A method for a content contributor user to publish a content post using a network-connected computing device executing a social networking application, the method comprising:

displaying, by a social networking application operating on a network-connected computing device associated with the content contributor user, a request notification initiated by a requesting user for the content contributor to post a qualifying content post; and precluding access by the content contributor user to one or more functions of the social networking application until the content contributor user has utilized the social networking application to transmit a qualifying content post to one or more other users comprising the requesting user; and wherein the qualifying content post comprises one or more images captured using the social networking application by one or more cameras integrated within the network-connected computing device associated with the content contributor user.

2. The method of claim 1, wherein the qualifying content post further comprises a content post generated by the content contributor user within a predetermined time period of the step of displaying a request notification from a requesting user to post a qualifying content post.

3. The method of claim 1, in which the step of displaying a request notification comprises displaying identification of the requesting user.

4. The method of claim 3, in which the step of precluding access by the content contributor user to one or more functions of the social networking application comprises: precluding the content contributor user from engaging in direct messaging with the requesting user.

5. The method of claim 1, further comprising: transmitting a qualifying content post to a network-connected social networking server for display to one or more users including the requesting user.

6. The method of claim 5, in which the step of transmitting a qualifying content post comprises: automatically rendering a content post authoring display on the computing device upon interaction of the content contributor user with the request notification.

7. The method of claim 6, wherein the content post authoring display comprises a countdown timer mechanism displaying a remaining time period during which a qualifying content post may be created.

8. The method of claim 7, in which the step of transmitting a qualifying content post comprises automatically capturing one or more images using one or more cameras integrated within the computing device, upon expiration of the countdown timer mechanism.

9. The method of claim 1, further comprising: confirming, by the social networking application using an image recognition module, that the one or more images captured using the social networking application comprises an image of the content contributor.

10. The method of claim 1, in which:
the step of displaying a request notification initiated by a requesting user for the content contributor to post a qualifying content post comprises determining, by the computing device, a first current geographic location associated with the computing device;
and further comprising the steps of:
determining a second current geographic location associated with the computing device during creation of a content posting; and
determining that the content posting is a qualifying content posting if the second current geographic location is within a predetermined distance from the first current geographic location.

11. The method of claim 1, further comprising the step of restoring access by the content contributor user to one or more functions of the social networking application upon expiration of a predetermined time period without transmission of a qualifying content post to one or more other users comprising the requesting user.

12. The method of claim 1, wherein the social media application is a mobile app operating on a mobile telephone, and wherein the qualifying content post further comprises a content post created after the posting user interacts with the request notification and prior to the posting user backgrounding the social media application mobile app.

13. The method of claim 1, wherein the qualifying content post is further displayed to the one or more other users proximate an indicium visually distinguishing the qualifying content post from other non-qualifying content posts.

* * * * *